June 1, 1943.	G. ZIEHER	2,320,695
MEASURING DEVICE
Filed Sept. 4, 1940

Inventor:

Patented June 1, 1943

2,320,695

UNITED STATES PATENT OFFICE 2,320,695

MEASURING DEVICE

Gustav Zieher, Jena, Germany; vested in the Alien Property Custodian

Application September 4, 1940, Serial No. 355,373
In Germany October 6, 1939

2 Claims. (Cl. 33—179.5)

This invention relates to measuring devices and particularly devices for measuring the width and pitch of teeth such as are commonly used in bevel and similar gears:

One of the objects of this invention is the provision of a pair of measuring legs pivoted about a common axis, with means for measuring the angle of their separation, and with the legs provided with measuring surfaces arranged so that the interconnecting line of both surfaces is parallel with the pivot.

Another object of this invention is the arrangement of a pair of measuring surfaces on one of the measuring legs, on opposite sides of such measuring leg and with both of such measuring surfaces intersecting with the line of the measuring surface on the other leg at the pivot on which both legs swing.

A further object of this invention is the provision of a simple and inexpensive angular measuring device for measuring or checking the tooth width and the pitch of the tooth in bevel gears and the like.

A further object of this invention is the mounting of an arresting stop upon each measuring leg, so as to swing perpendicularly to the measuring surface of each leg.

Figure 1:
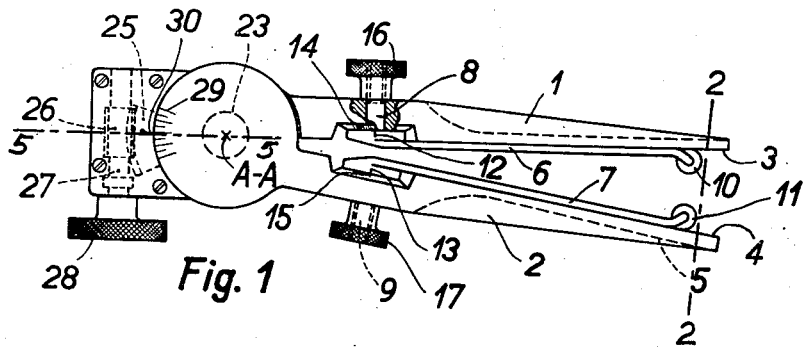
Figure 1 is a plan view of my improved measuring instrument.

Referring now to the drawing, the reference numerals 1 and 2 designate measuring legs pivoted about the axis A—A, one leg, as 2, carrying a circumferential scale 29 co-operating with a pointer 30 carried by the other leg, as 1, for indicating the angle of separation of the measuring legs. Leg 1 is provided with a plane surface 3, and leg 2 with two plane surfaces 4 and 5 respectively, which surfaces are used for measuring purposes as hereinafter described, and with all three of such planes being arranged to mutually intersect at the axis of the pivot A—A.

Pivoted upon each measuring leg intermediate its ends is an arresting stop, the pivot of such stops being arranged perpendicularly to the pivotal axis A—A of the measuring device, as best shown in Figure 1. An arresting stop 10 is mounted at the free extremity of arm 6, pivoted, as at 8, upon the measuring leg 1. Provision may be made for clamping the arm 6 in any angular position, as by means of a knurled nut 16. Similarly the leg 2 is provided with a swinging arm 7 carrying on its free end an arresting stop 11, and pivoted on its other end, as at 9, with a clamping nut 17 retaining it in various adjusted positions. One or both of the pivots 8 and 9 may be provided with a pointer 12, 13, co-ordinated with circumferential scales 14, 15, carried by the measuring legs.

Figure 5:
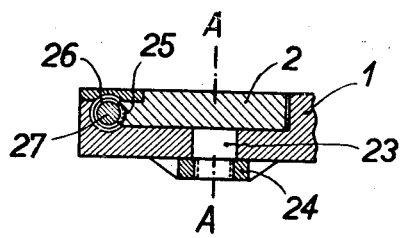
Figure 5 is a detail vertical section taken substantially on the line 5—5 of Figure 1.

As best shown in Figure 5, the pivot 23 is preferably mounted on measuring leg 2 and is retained in pivotal position with relation to leg 1 by the nut 24. As herein shown, leg 2 also carries a worm gear segment 25 meshing with a worm gear 26 journalled so as to be readily rotated by turning the driving knob 28, mounted at the extremity of the shaft 27 of the worm gear.

In use, the angle embraced by the measuring surfaces on the legs 1 and 2 respectively may be read off on scale 29 and compared with the theoretical or desired value to determine toothwidths or tooth-pitch of the bevel gear teeth as computed. To determine the tooth-width, at least two teeth of the bevelled gear are clamped between the adjacent measuring faces 3 and 4 and such measuring faces placed against the flanks of the teeth when the axis A—A of the instrument stands approximately perpendicular to the plane of such contact. To determine the tooth-pitch the measuring faces 3 and 5 are used so that they rest on the flanks of adjacent teeth sloping in the same direction.

Figure 2:
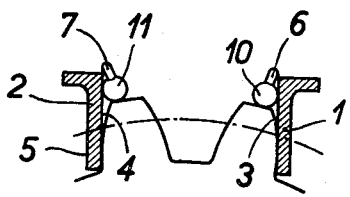
Figure 2 is a cross sectional view through the measuring legs in contact with two teeth of a bevel gear, the section line being substantially on the line 2—2 of Figure 1.

In Figure 2 is shown the use of my improved measuring device for ascertaining tooth-width, and tooth-heights can be determined by swinging the arresting stops 10 and 11 into engagement with the peripheral faces of the teeth, or such arresting stops can be maintained in the position shown, in Figure 2, and the measuring legs 1 and 2 adjusted to measure the distances between the flanks of adjacent teeth at various distances from the axis of the gear, including, of course, the pitch line.

Figure 3:
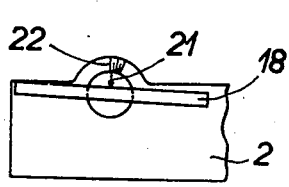
Figure 3 is detail side elevation showing a pivotal mounting of a modified form of arresting stop from that shown in Figure 1.
Figure 4:
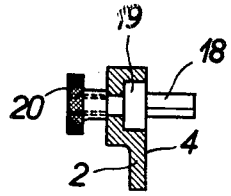
Figure 4 is a detail cross sectional view taken substantially on the line 4—4 of Figure 3.

In Figures 3 and 4 I have shown a modified form of arresting stop wherein a rectangular strip 18 is arranged longitudinally of the measuring faces on each leg 1 and 2 being mounted on a pivot 19, so that it can be clamped in any adjusted position by means of a knurled nut 20. A pointer 21 may extend radially from the pivot 19 to co-operate with a circumferential scale 22 to quickly indicate the angular position of the strip 18.

Other embodiments of my invention will be readily apparent to those skilled in the art.

I claim:

1. A measuring device for measuring the tooth-width of bevel gears comprising two measuring legs mounted pivotally about an axis, each of said legs being formed with measuring planes, facing each other, and with their intersecting line parallel to said axis, means for measuring the angle between said measuring planes, and means for measuring the pitch of teeth of bevel gears, said device having a further measuring plane prevented by one of said measuring legs, said further measuring plane being so situated that it contains the intersecting line of said measuring planes.

2. A measuring device for measuring the tooth-width of bevel gears comprising two measuring legs mounted pivotally about an axis, each of said legs being formed with measuring planes, facing each other, and with their intersecting line parallel to said axis, means for measuring the angle between said measuring planes, said device having at least one arresting stop, means for mounting said stop pivotally about an axis perpendicular to the pivot axis of said legs.

GUSTAV ZIEHER.